April 22, 1958
B. L. HENKE
2,831,977
LOW ANGLE X-RAY DIFFRACTION
Filed March 11, 1954
3 Sheets-Sheet 1
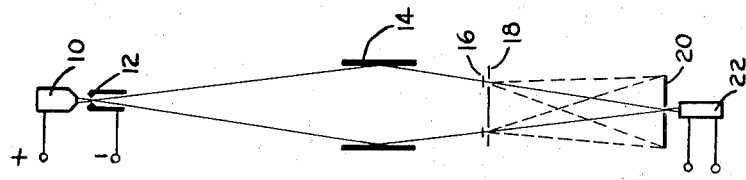
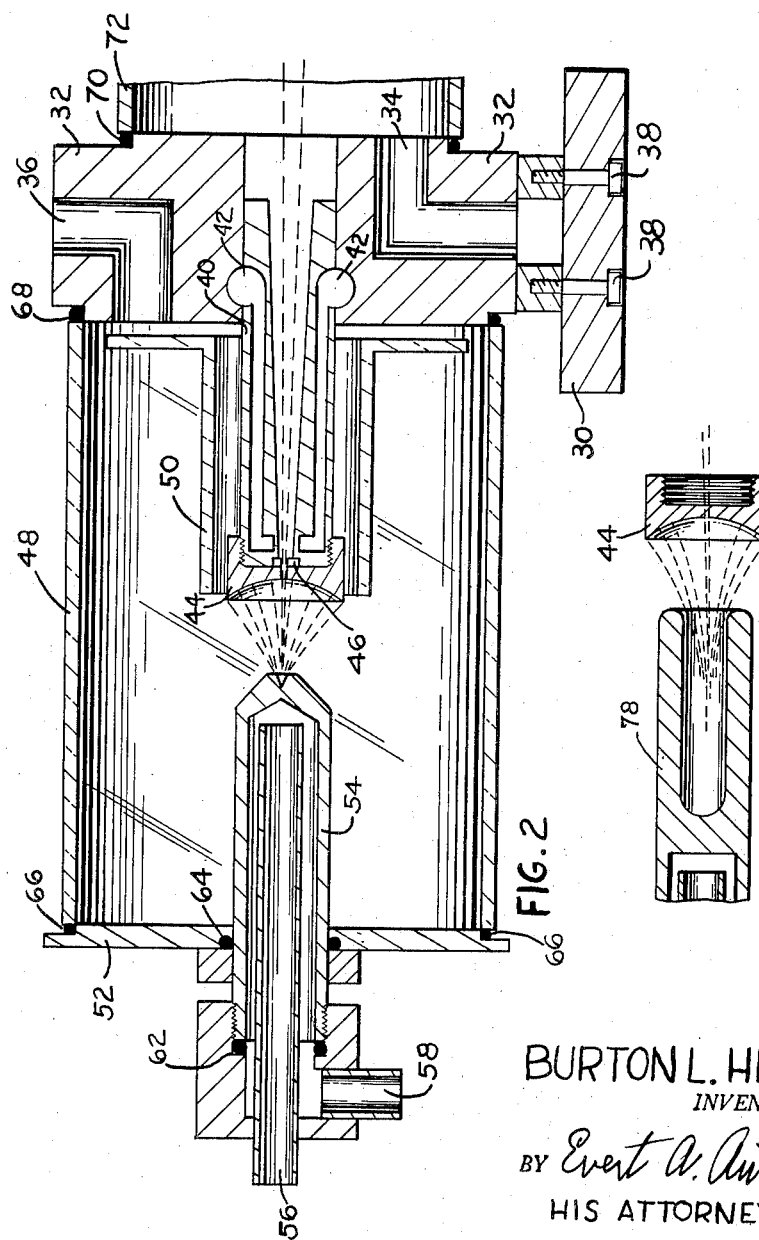
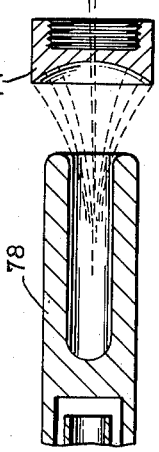
BURTON L. HENKE
INVENTOR.
BY *Evert A. Autrey*
HIS ATTORNEY

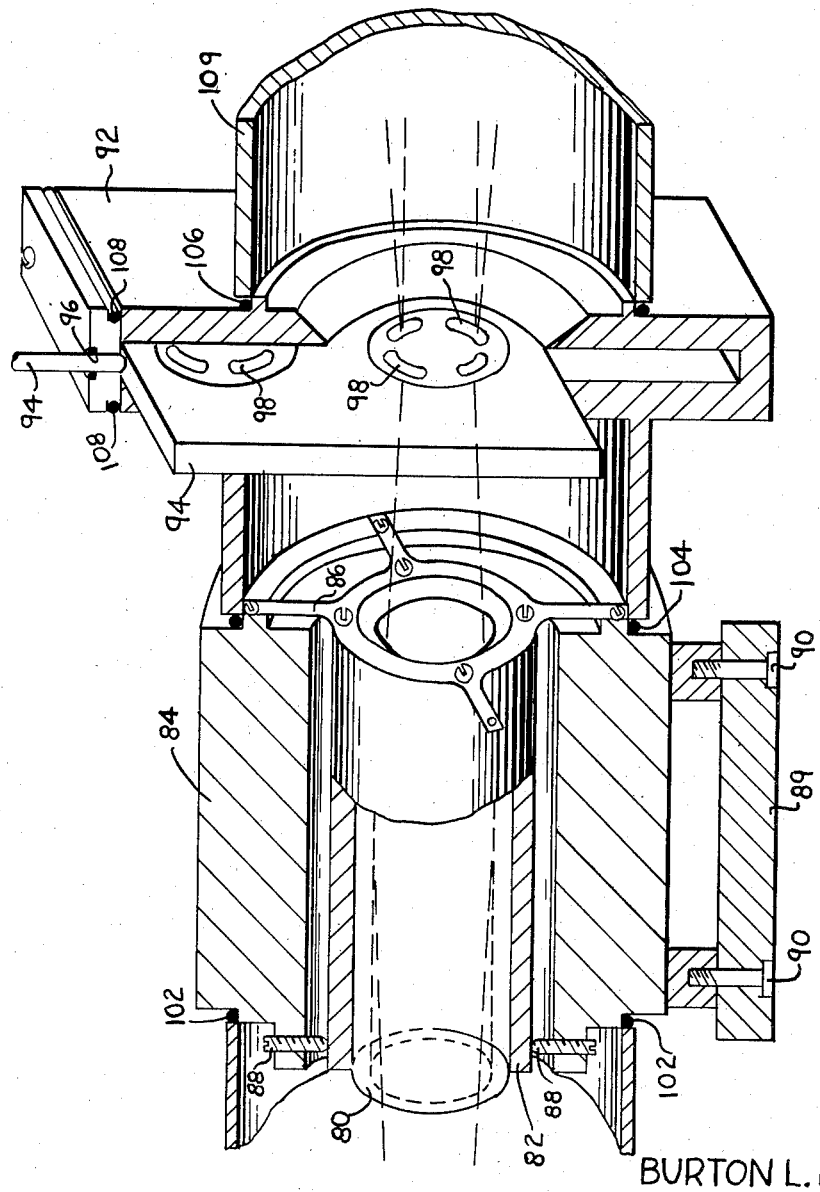

April 22, 1958     B. L. HENKE     2,831,977
LOW ANGLE X-RAY DIFFRACTION
Filed March 11, 1954                               3 Sheets-Sheet 3
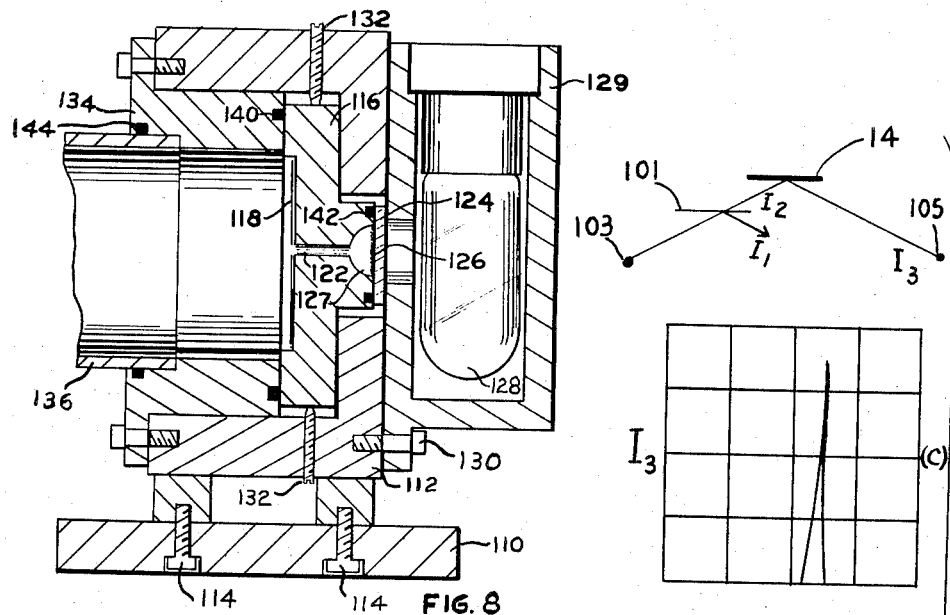
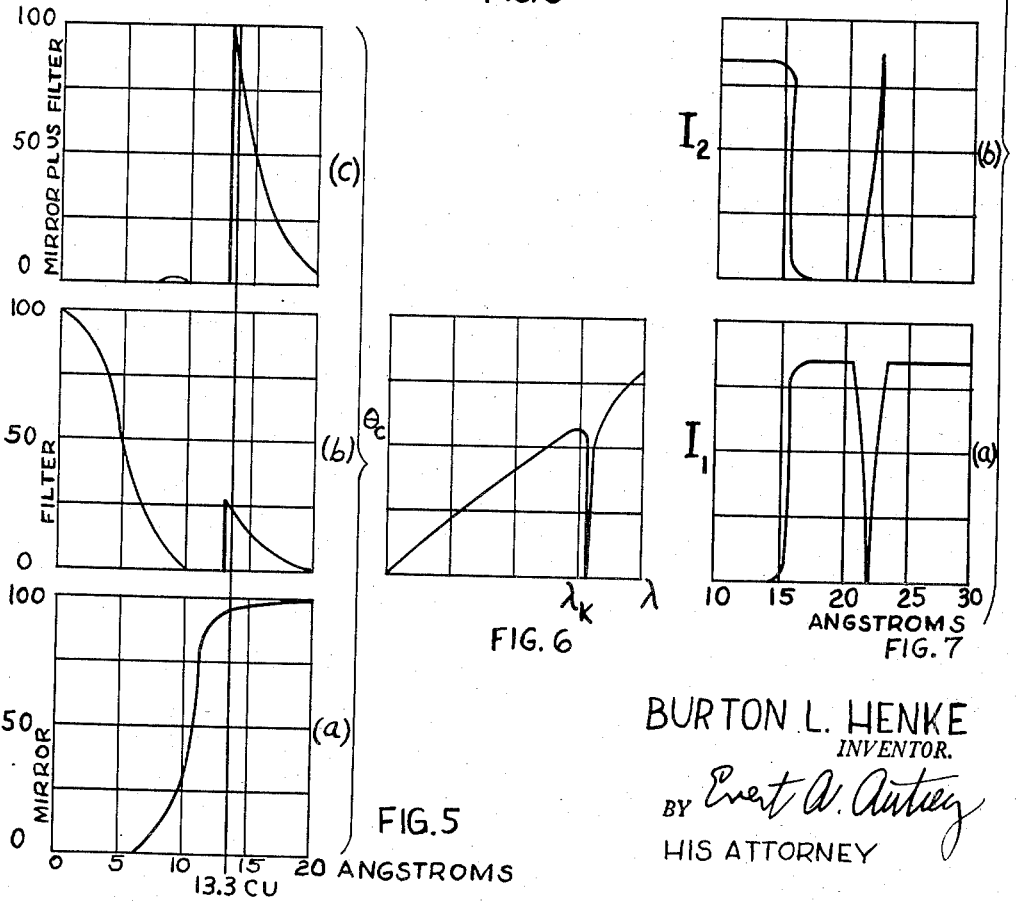
BURTON L. HENKE
INVENTOR.
BY Evert A. Autrey
HIS ATTORNEY

United States Patent Office 2,831,977
Patented Apr. 22, 1958

2,831,977

LOW ANGLE X-RAY DIFFRACTION

Burton L. Henke, Pomona, Calif., assignor to California Institute of Technology, Pasadena, Calif., a corporation of California Application March 11, 1954, Serial No. 415,490

9 Claims. (Cl. 250—53)

The invention herein described may be manufactured and used by or for the Government of the United States of America for governmental purposes without the payment of any royalties thereon or therefor.

This invention relates to X-rays and more particularly to the production and utilization of long wavelength, monochromatic, high intensity, point-focusing X-rays.

The use of long wavelengths in the investigation of submicroscopic structure by low angle diffraction methods is of considerable interest because the effects of multiple scattering multiple refractions, and of electron density fluctuations within the particles become or can be made vanishingly small for these wavelengths. This makes the direct application of a relatively simple theory of low angle diffraction feasible. Secondly, the larger angles of scattering for the long wavelengths open up to experimental observation the very important central portion of the diffraction pattern. Finally, the sizes of the particles and the thinness of the sample mountings appropriate to these wavelengths permit direct comparison studies with the electron microscope. These provide valuable complementary information as to the nature of packing and other gross features of the material. Investigations of this sort have not been previously carried out in the long wavelength region. This has been due to the necessity of working in a vacuum and with very low X-ray production efficiencies. In order to meet such problems a new type of diffraction instrumentation has been developed which is designed to operate at such wavelengths as Cr-K, Al-K, Cu-L, O-K, and C-K lines (2.3, 8.3, 13.3, 23.6, and 44.5 angstroms, respectively).

With crystal or grating X-ray monochromators known in the prior art, a considerable amount of intensity is rejected in order to secure resolving power. For the long wavelengths of interest here, such resolving power is not necessary. In fact, the major problem in the monochromatization of these wavelengths is the suppression of the hard continuous radiation. In the instant invention the method of obtaining a low angle diffraction pattern with long wavelengths is based upon the total reflection of an X-ray beam to obtain a point focus, and the utilization of the critical angle for reflection to provide an effective "cut-off" for the hard component of the continuous background radiation. High intensity point-focusing is achieved, and an effective monochromatization is obtained without rejecting any desired radiation, in a manner superior to straight filter methods. A nearly cylindrical, totally reflecting mirror is used which forms a point-focused image of a point source. The mirror may be ground and polished into an ellipsoidal section from Pyrex glass. In this way a solid angle of radiation is used which is from one hundred to several thousand times that of comparable pinhole geometries. A combination of methods has been used to suppress almost completely all background radiation. A specially designed gas filled X-ray tube has been developed to give a high intensity of radiation in a direction 180° from that of the electron beam by placing the entrance pinhole inside the cathode focusing cup. Soft continuous radiation in this "back" direction is at a minimum. The mirror is constructed so as to present angles of reflection only at the critical angle for the desired radiation. In this way, all radiation that is harder is effectively cut off. Finally, the soft component of the background that remains is rapidly absorbed by the filter action of an appropriately chosen substrate on which the sample is mounted.

An object of this invention is to provide apparatus for producing a high intensity, monochromatic, point-focused beam of soft X-radiation.

An additional object is to provide a novel gas filled X-ray tube with the entrance pinhole located in the cathode focusing cup for use with a reflecting mirror in a demountable envelope.

A further object is to provide a method for the utilization of long wavelength X-rays to obtain diffraction and interference patterns.

A still further object is to provide a system for adjusting X-ray diffraction apparatus for optimum alignment and for accurate exposure determinations.

Other objects and many of the attendant advantages of this invention will be readily appreciated as the same becomes better understood by reference to the following description.

Fig. 1 is a schematic plan of the instrument;

Fig. 2 is a view in section of an X-ray source suitable for use in the apparatus;

Fig. 3 is a view of the target and cathode for a modified form of the X-ray source shown in Fig. 2;

Fig. 4 is a view, partly in section, of a mirror and mounting therefor;

Fig. 5 is a graph illustrating the band pass characteristics of a combination of a totally reflecting mirror and filter;

Fig. 6 is a graph illustrating the characteristic beta X-radiation suppression of a mirror;

Fig. 7 shows a double mirror-filter schematic plan with graphs illustrating the path of radiation therethrough; and Fig. 8 is a view in section of a film mount and monitor.

The instrument shown in Fig. 1 comprises a water cooled target 10 and a water cooled cathode 12 having an entrance pinhole in the body of the cathode. The large solid angle X-ray beam is point-focused by means of an ellipsoidal mirror 14, and the X-rays then pass through sample 16 mounted on an annular stop and sample holder 18. The diffracted rays, as shown by the dashed lines impinge upon a sensitive film 20 which is provided with a central aperture for allowing undiffracted rays to enter monitor system 22.

A typical assembly has the entrance pinhole in cathode 10 located aprpoximately 56 centimeters from mirror 14 which is 36 centimeters from sample mount 18 and sample 16. Photographic film 20 is located 20 centimeters from the sample holder. In the operation of the apparatus which is mounted in a sealed envelope, not shown, a vacuum is pulled on the system as a unit by means of an external diffusion pump backed by a mechanical pump. Due to the relatively small volume of the apparatus for the wavelengths employed, a sample reloading cycle of about 20 minutes is possible. The high voltage is applied to the tube after the circulation of cooling water through the anode and cathode is started. The high voltage is set at the desired value and the current through the tube is then regulated by adjusting the internal gas pressure. An indication of the exposure time required for any particular sample is obtained by connecting the monitor system 22 into well known external circuitry. The film used to record the desired pattern is removed from the apparatus after exposure and developed in the normal manner.

The calibration of the apparatus lies simply in the measurement of its linear dimensions. The apparatus has been found useful, among other things, for accurately measuring the diameter of uniform particles which may then be used to calibrate electron microscopes. Heretofore, the calibration of electron microscopes could not be carried out with an accuracy commensurate with the resolution of such a microscope. The calibration procedure is simplified by the fact that the same sample and mounting may be used in the X-ray apparatus and in the electron microscope. The manner of operation and the structural details of components of the instrument are explained more fully hereinafter.

The gas X-ray tube shown in Fig. 2 comprises a baseplate 30 supporting a structural member 32 defining passages 34 and 36 for conducting gases in and out of the tube. Member 32 is secured to baseplate 30 by means of bolts 38. The cathode support 40 is secured by member 32 and is provided with passageway 42 for conveying water to the interior of cathode focusing cup 44 for cooling. Cup 44 is preferably composed of pure aluminum because of its low sputtering rate and screws into position to hold a disk 46 of aluminum in contact with cathode support 40. The diameter of the aperture in disk 46 may be on the order of 0.008 inch. The outer cylindrical jacket 48 may be made of a glass such as Pyrex as is the cylindrical baffle 50 which causes the tube to operate more smoothly and prevents sputtered material from reaching the outer walls.

End plate 52 supports anode 54 which is provided with an input tube 56 and an outlet port 58 for cooling water. The O-ring seals 62, 64, 66, 68, and 70 serve to seal the chamber for operation and still permit the tube to be dismantled readily. Cylinder 72, of which only a fragment is shown, connects the X-ray source to the next unit of the assembly which is the reflecting mirror. The cylinder 72 may be made of brass for ease of construction and then nickel plated to resist corrosion. The paths of the electrons and X-rays are shown by the dashed lines. The entrance pinhole is located in the cathode focusing cup. Therefore, only the radiation 180° from the electron beam direction is used. It is in this direction that the continuous radiation will be a minium. Target anode 54 is indented with a cone shaped hole, as shown, at the electron beam focus. In this way, the atoms which can be seen through the pinhole give off radiation not only by direct bombardment under the electron beam, but also by secondary radiation excited by the fluorescent absorption of harder components of the general radiation in the neighboring region of the hole. In extreme cases where even more radical suppression of the continuous radiation is required it is possible to use a similar geometry so that only this indirectly excited secondary component of the line radiation leaves the X-ray source. A typical operating condition of the tube is 40 to 50 milliamperes at 5,000 volts. The stability is such that after a period of about two hours for stabilization, the tube may be left for a period of days without further attention.

To obtain oxygen K lines (23.6 angstroms), $SiO_2$, $Al_2O_3$, and BeO targets have been successfully used. The targets were obtained by embedding a thin quartz disk into a water cooled copper anode, by anodizing the tip of an aluminum anode, and by painting an acid solution of BeO onto the tip of an aluminum anode, respectively.

The anode of the gas discharge tube of Fig. 2 may be modified as shown in Fig. 3 for special applications. Gas anode 78 is provided with a long axial hole extending from the tip as shown. The focusing, bowl-shaped cold cathode 44 emits electrons under positive ion bombardment which enter the hole or bore in the anode, and the gas in the otherwise unmodified tube is held at a pressure such that the mean free path of the electron is equal to the distance necessary for it to gain excitation energy before collisions so that only the pure, characteristic radiation from the gas atoms leaves the pinhole. The gas from which the desired radiation is to be obtained may be bled slowly into the closed system at any convenient point but preferably near the anode. The operation of the gas anode tube is otherwise the same in all respects as for the tube having a solid tipped anode. Suitable gases for the gas anode tube operation include but are not limited to neon, oxygen, nitrogen, and carbon which is used in the form of a vapor of a volatile organic compound.

Both types of the described gas tubes are simple, completely demountable, very stable, and permit the focusing of a very intense electron beam upon the anode. Gas tubes do not require as high a vacuum as filament type tubes and it is therefore possible to use them open to the evacuated camera and mirror assembly.

The mirror and sample holder shown in Fig. 4 comprise mirror 80, mirror mounting tube 82, mirror frame 84, a flexible spider 86 for securing mounting tube 82 to frame 84, and mirror adjusting screws 88 of which two are shown. Mirror frame 84 is secured to base 89 by means of bolts 90. Housing 92, which encloses sample slide 94, joins to frame 84. The sample slide which may be designed for one or more samples, is positioned by means of rod 94 entering the evacuated space through O-ring seal 96. The sample to be tested is normally mounted on a thin film of metal foil or plastic which is stretched across an annular slit 98 through which the beam passes. The sample may be positioned at various locations between the mirror and film. Small particles diffract X-rays most so the sample can be close to the film. Samples composed of larger particles can be placed farther from the film to secure a magnification of the pattern. Since long wavelength X-rays are readily stopped by other than the thinnest of materials, the central area of slide 94 stops all X-rays which are not focused by the mirror and forms a hollow cone of radiation to impinge upon the recording film. O-ring seals 102, 104, 106, and 108 seal the assembly. Metal cylinder 109 connects the mirror assembly to the film mount and monitor.

Ideally, the mirror should be a section of an ellipsoid of revolution with the point source of X-radiation and the point image at the respective foci, but it it possible to readily compute the radius of a circular arc to closely approximate the ellipse at the center point. The gain in intensity of a reflecting mirror of the type shown over a pinhole geometry has a value of about 2,000 times even after allowing for the relatively low reflection efficiency of glass. Glass is the preferred material for the mirror since smooth surfaces are readily obtained and optical lapping techniques have been highly developed for glass. The polished surface of the glass may be coated with various metals for special requirements. A short length of glass tubing having an inside diameter of 1.5 inches is suitable for constructing a mirror having a distance between the point source and the point image of 110 centimeters. A short iron lap used with powdered abrasives readily generates the desired circular arc which may be checked as the grinding progresses by means of an air gage.

The band pass characteristics of a mirror-filter combination are shown in Fig. 5. The L radiation of copper reflected from an uncoated glass mirror and passed through a thin copper foil is illustrated by way of example but it will be understood that the technique may be adapted for use with other combinations of radiation, mirror material, and filter material.

In Fig. 5(a), the relative intensity of the reflection of copper L radiation at 13.3 angstroms from a totally reflecting mirror surface is plotted against wavelength. The reflection is negligible for wavelengths below about 10 angstroms and is nearly 100% for wavelengths above about 12 angstroms. The transmission of copper L radiation through a thin copper foil is shown in Fig. 5(b). It will be noted that the transmission falls to zero at about 10 angstroms due to resonance phenomena and rises sharply at about 13.0 angstroms since a metal will freely transmit radiation from a target made of that same metal. The peak transmission at 13.0 angstroms drops to a negligible value as the wavelength is increased. The combination of mirror and filter bring about the result shown in Fig. 5(c) in which intensity on the arbitrary vertical scale is plotted against wavelength on the horizontal scale. The sharp spike which represents good monochromatization is readily obtained in practice. In a typical case, a copper anode is used to obtain the copper L radiation. The radiation is first reflected by the ellipsoidal mirror which effectively cuts off all X-rays harder than the desired radiation. The remaining radiation passes through a thin copper foil before reaching the sample which is mounted directly on the foil, and the copper foil filter removes all radiation appreciably longer in wavelength than the copper L wavelength.

In Fig. 6 the curve showing the variation of the critical angle of reflection ($\theta_c$) with wavelength ($\lambda$) near a critical K-absorption edge of an aluminized reflector is plotted. Aluminum K radiation having a wavelength of 8.32 angstroms has special advantages for many types of investigations. This radiation is very strong, and the aluminum target is durable and easy to cool so that a relatively large amount of power can be used in the X-ray tube. The small amount of aluminum that is sputtered onto the anode from an aluminum cathode focusing cup cannot contaminate the anode since it is made of the same material, and the best filter for aluminum radiation is aluminum foil which is easy to obtain and to handle even in very thin sheets thus forming an excellent sample mounting medium. However, aluminum filtered K-series Al radiation does not have sufficient monochromatization for precise low angle diffraction work under normal circumstances because the aluminum $K_{beta\ 1}$ (7.97) radiation is not of negligible intensity and is five percent harder. It has been discovered, however, that at the critical absorption wavelength $\lambda_k$ there is a very abrupt decrease in the critical angle of reflection. Since the Al-$K_{\beta 1}$ (7.965 angstroms) and the Al-$K_{\alpha 1,2}$ (8.320 angstroms) lines are 0.4 percent and five percent longer in wavelength respectively than the critical absorption wavelength of 7.936 angstroms, there is an appreciable difference in the critical angle of reflection for these two lines. Therefore, by constructing the aluminized ellipsoidal mirror of such diameter as to present effectively only the critical angle of reflection for the $K_{\alpha 1,2}$ line, the $K_{\beta 1}$ line is greatly reduced in intensity since this angle of reflection is not favorable for this harder radiation. This method yields a very high intensity of aluminum $K_{\alpha 1,2}$ radiation which is much more monochromatic than would be possible with the filter technique. This technique of Beta radiation suppression is particularly applicable to aluminum radiation but is obviously not limited thereto.

In Fig. 7 a schematic of a totally reflecting mirror and an additional mirror is shown along with graphs illustrating the band pass characteristics of the arrangement. This total reflection-filter method may be used to obtain the very narrow band-pass characteristic shown in Fig. 7(c). The pass band must coincide with the critical absorption wavelength region of an element which is present in relatively large proportions in a thin self-supporting film 101. Radiation from source 103 is permitted to be incident upon this film in a small region of angles slightly larger than the critical angle of reflection for the critical absorption edge wavelength. Hence this wavelength passes through the film. However, because of the abrupt decrease in the critical angle of reflection at an absorption edge, a region of wavelengths just shorter than this critical wavelength will be reflected by the film along with all wavelengths which are longer as shown in Fig. 7(a). Only the relatively short wavelengths and the critical wavelength region will be transmitted as shown in Fig. 7(b). The intensity I is plotted against wavelength in the graphs. A second reflection from a mirror 14 which does not contain the element, the absorption edge of which was utilized in the first reflection, may then be used to cut off the short wavelength component of the beam, passing only the narrow critical wavelength band thus giving the peak shown in Fig. 7(c).

For example, as illustrated in Fig. 7, the oxygen-$K_{\alpha 1,2}$ line (23.6 angstroms) may be isolated as described above by using for the first reflector 101, a thin quartz film ($SiO_2$), and for the second 14, an aluminized reflector. The film may be mounted upon a cylindrical support and the aluminized reflector may be a section of an ellipsoid of revolution thus rendering a point-focused beam at point 105. It will be understood that the components of the apparatus, of which one half is schematically shown, are actually symmetrical around a central axis of revolution and the X-ray source is preferably of the gas anode type illustrated in Fig. 3.

The film mount shown in Fig. 8 comprises a base 110 attached to film mount frame 112 by bolts 114. Film mount 116 is recessed to accommodate film 118. The film is circular with a concentric central opening the size of bore 122 which permits the central undiffracted beam of X-rays to strike glass plate 124 which has a thin layer of fluorescent material 126 on the innermost side. A large solid angle of the light radiation from the fluorescent material is utilized by placing a concave mirror surface 127 immediately behind the window formed by plate 124. The light thus created by the action of X-rays on the fluorescent material impinges upon a photomultiplier tube 128 such as a 931A type tube, for example, which may be connected to an external circuit to give an indication of the relative intensity of the direct beam. This means of measuring the intensity of the direct beam permits an adjustment of the focal spot on the anode for optimum intensity, the absorption within the sample and the proper sample thickness can be determined from the direct beam intensities with and without the sample in place, and an accurate determination of exposure can be made directly, rather than determined indirectly from the tube voltage and the tube current. If desired, the X-ray intensities may be monitored by means of a Geiger or proportional counter. The efficiency of these counters is greater than that of the scintillation counter shown for long wavelength X-radiation.

The photomultiplier tube is mounted within a light tight housing 129 attached to frame 112 by means of bolt 130. Film mount 116 is centered by four adjusting screws 132 of which two are shown in the drawing. Removable ring member 134 facilitates the assembly of the unit, restrains the motion of film mount 116 to a single plane, and connects the camera unit to metal cylinder 136. O-ring seals 140 and 142 allow the film mount to be centered by the adjusting screws without breaking the vacuum in the system, and O-ring seal 144 provides a tight connection between ring member 134 and cylinder 136.

Obviously, many modifications and variations of the present invention are possible in the light of the above teachings. It is therefore to be understood that within the scope of the appended claims the invention may be practiced otherwise than as specifically described.

What is claimed is:

1. An apparatus for generating monochromatized point-focused X-rays comprising a target electrode, a focusing cup cathode aligned with said target and defining a pinhole aperture of the exit of X-rays generated at said target electrode, a totally reflecting ellipsoidal mirror aligned with the central beam of X-ray exiting through said pinhole and having an internal curvature to present angles of reflection only at the critical angle for the desired radiation, and a common sealable envelope enclosing said target electrode, cathode, and mirror.

2. Apparatus for generating monochromatic X-rays comprising a point source of a large solid angle of X-radiation, a totally reflecting point-focusing ellipsoidal mirror presenting an angle of reflection to said X-radiation to reflect only X-rays equal to and longer in wavelength than the monochromatic radiation desired, and a filter disposed between said X-ray source and said point focus effective to absorb all X-radiation longer in wavelength than the monochromatic radiation desired.

3. Apparatus for generating monochromatic X-rays comprising a copper anode X-ray source for generating a large solid angle X-ray beam rich in 13.3 anstrom Cu-L radiation, a totally reflecting ellipsoidal mirror presenting an angle to said X-ray beam to reflect appreciably only radiation having a wavelength longer than about 12 angstroms, and a copper foil filter for absorbing all X-radiation appreciably longer in wavelength than Cu-L radiation.

4. A method of aluminum beta ray suppression comprising generating a large solid angle of aluminum X-radiation, reflecting said radiation from an aluminized ellipsoidal mirror presenting only the critical angle of reflection for the Al-K alpha line whereby the Al-K beta radiation is substantially completely absorbed by the mirror.

5. Apparatus for monochromatizing X-radiation comprising a source of X-rays, a thin generally cylindrical film section containing a high proportion of an element having a critical absorption wavelength substantially coinciding with the wavelength of the monochromatic radiation desired, a totally reflecting ellipsoidal mirror surface not containing said element for cutting off all X-radiation harder than that desired whereby the narrow critical wavelength band only is reflected from said mirror, and means for positioning said cylindrical film section on an axis through said source of X-rays and coaxial with said ellipsoidal mirror surface.

6. The invention defined in claim 5 wherein said film is composed of $SiO_2$ and said mirror surface comprises aluminum.

7. X-ray diffraction apparatus comprising a target, a cathode for focusing electrons on said target and defining a central exit pinhole, a totally reflecting ellipsoidal mirror effective to reflect only radiation softer than the pass band of radiation desired and positioned in alignment with X-radiation from the pinhole in said cathode, a sample film effective to transmit the pass band of radiation desired and to absorb all softer radiation, a sample holder for positioning the film on which the sample is normally mounted and defining an annular opening, a recording film disposed to be struck by radiation from said annular opening in said sample holder, a recording film mounting defining a bore for the passage of undiffracted radiation through a central opening in said recording film and defining a hemispherical reflecting surface, a transparent plate disposed in the path of radiation through said bore, a fluorescent material mounted on the inner surface of said plate whereby light energy is produced when X-radiation strikes said material and is concentrated by said reflecting surface, and light measuring means disposed adjacent the outer surface of said plate.

8. A method of beta radiation suppression comprising generating a large solid angle of X-radiation rich in a given fluorescent series radiation and reflecting said radiation from an ellipsoidal mirror section of a surface comprised mainly of an element having a critical absorption edge wavelength very nearly equal to the beta component of said series radiation, said surface presenting angles of reflection small enough to allow only the reflection of the desired alpha component of the series radiation whereby the beta component is substantially completely absorbed by the mirror.

9. A method for the suppression of a narrow band of X-radiation wavelengths comprising generating a large solid angle of X-radiation and reflecting said radiation from an ellipsoidal mirror section of a surface comprised mainly of an element having a critical absorption edge wavelength substantially equal to that associated with the narrow band of wavelengths to be suppressed and reflecting said radiation at angles larger than those required for the total reflection of the radiation to be suppressed whereby said radiation to be suppressed is substantially completely absorbed by said mirror.

References Cited in the file of this patent

UNITED STATES PATENTS

| | | |
|---|---|---|
| 1,056,401 | Caldwell | Mar. 18, 1913 |
| 1,117,267 | Snook | Nov. 17, 1914 |
| 1,566,279 | King | Dec. 22, 1925 |
| 1,685,928 | Morrison | Oct. 2, 1928 |
| 1,865,441 | Murscheller | July 5, 1932 |
| 2,617,942 | McLachlan et al. | Nov. 11, 1952 |
| 2,636,993 | Jacobson | Apr. 28, 1953 |
| 2,645,720 | Gross | July 14, 1953 |
| 2,653,249 | Harker | Sept. 22, 1953 |
| 2,659,012 | Bromberg et al. | Nov. 10, 1953 |
| 2,759,106 | Wolter | Aug. 14, 1956 |